United States Patent
Weglin et al.

[15] 3,678,577
[45] July 25, 1972

[54] METHOD OF CONTEMPORANEOUSLY SHEARING AND BONDING CONDUCTIVE FOIL TO A SUBSTRATE

[72] Inventors: Walter Weglin; Charles W. Wildebour, both of Seattle, Wash.

[73] Assignee: Jerobee Industries, Inc., Redmond, Wash.

[22] Filed: Sept. 25, 1969

[21] Appl. No.: 861,206

Related U.S. Application Data

[63] Continuation-in-part of Ser. No. 225,482, Sept. 24, 1962, abandoned.

[52] U.S. Cl. ............................29/625, 83/53 R, 156/251 R, 72/55 R, 174/68.5
[51] Int. Cl. ....................................................H41m 3/08
[58] Field of Search .........................................29/624–630 T; 156/267, 251–261; 174/68.5; 83/53; 72/55

[56] References Cited

UNITED STATES PATENTS

| | | | |
|---|---|---|---|
| 3,301,730 | 1/1967 | Spiwak et al. | 29/628 W |
| 3,015,718 | 1/1962 | Petri | 29/625 |
| 2,986,804 | 6/1961 | Greenman | 29/625 |

*Primary Examiner*—John F. Campbell
*Assistant Examiner*—Robert W. Church
*Attorney*—Christensen and Sanborn

[57] ABSTRACT

A method is disclosed for manufacturing a composite structure such as a printed circuit board comprised of a pattern of foil strips bonded to an underlying support. Initially, the method comprises the step of placing a continuous uninterrupted layer of die material face-to-face with a flat integral base in a press. A sheet of foil is arranged opposite the foregoing assembly in the press, with a layer of unactivated adhesive material interposed between the foil and the base, and the foil is stamped directly against the opposite face of either the layer of die material or the base, while the layer of die material is compressible in relation to the base without undergoing substantial lateral deformation. The stamping operation is carried out with a stamp having a raised surface thereon which is substantially flat and corresponds in profile width and outline with the pattern of strips, and with a stroke which displaces those portions of the die material lying relatively opposite the surface of the stamp, but which does not compress those portions of the adhesive and die material relatively surrounding the outline of the surface. As a result, shear forces are generated between the respective stamped and unstamped die portions without activating the unstamped adhesive portions. The shear forces separate the pattern of strips from the unstamped foil, and the strips are bonded to either the layer of die material or the base, depending on the level at which the stamp's stroke is bottomed in the assembly. Since the unstamped adhesive material is unactivated, the unstamped foil and adhesive material is easily relatively removed from the assembly to expose the pattern of strips.

3 Claims, 19 Drawing Figures

PATENTED JUL 25 1972 3,678,577
SHEET 1 OF 2
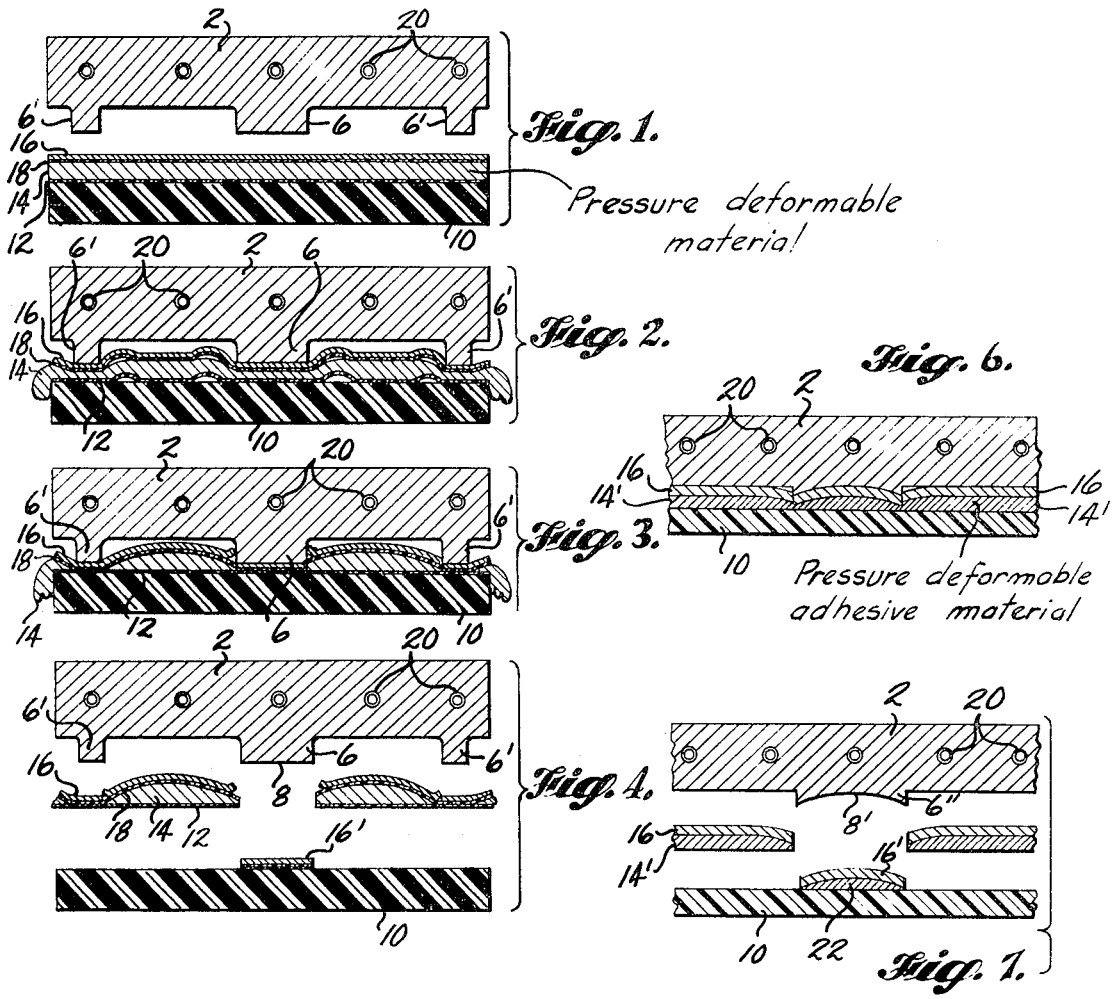
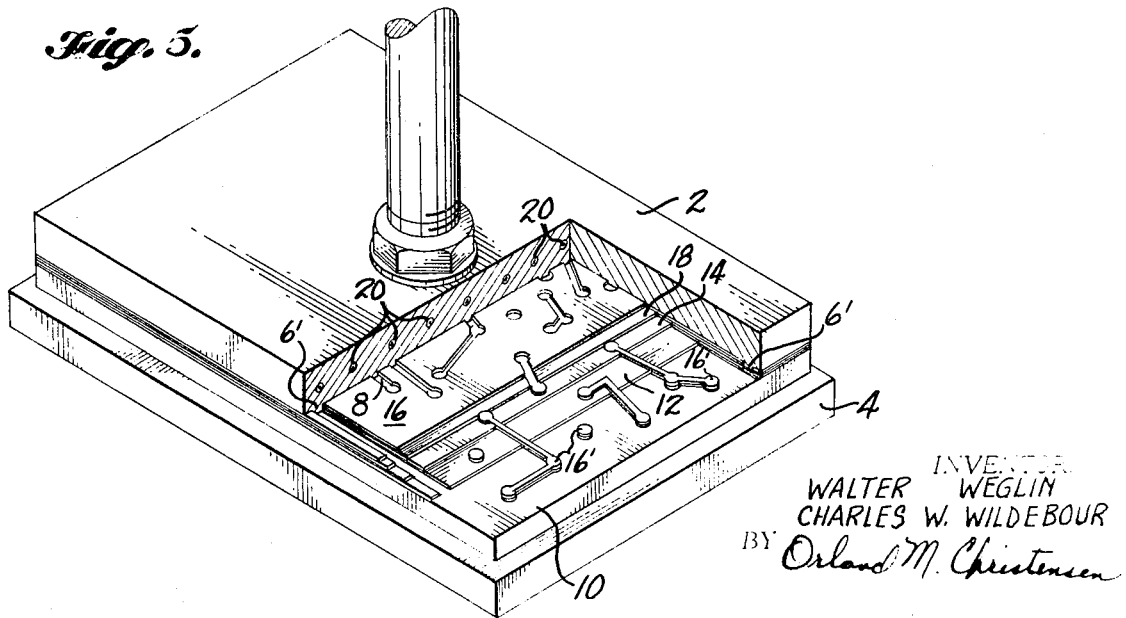
INVENTOR
WALTER WEGLIN
CHARLES W. WILDEBOUR
BY Orland M. Christensen
ATTORNEY

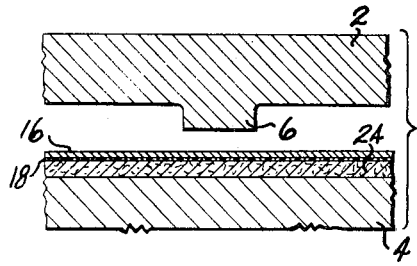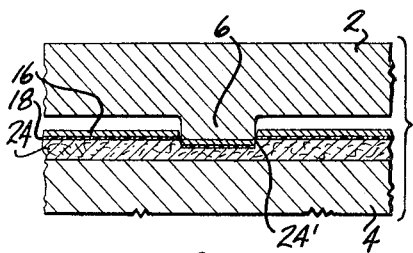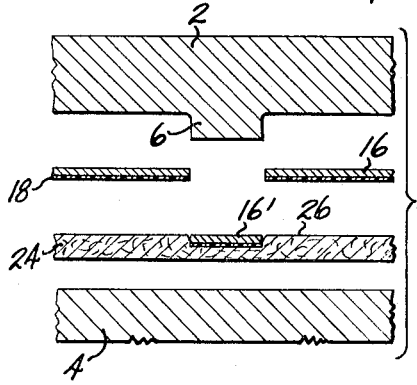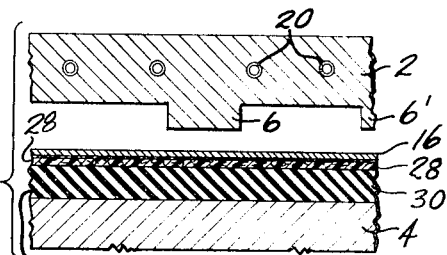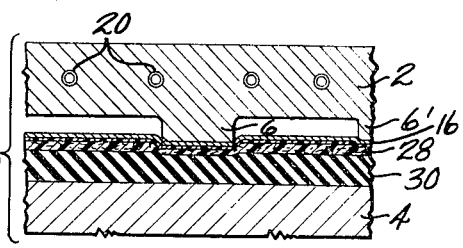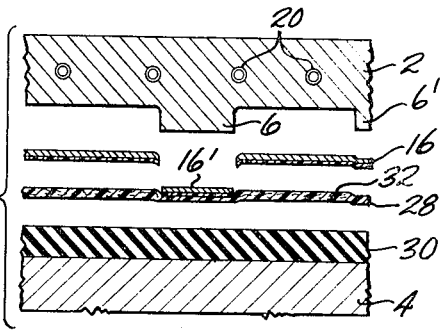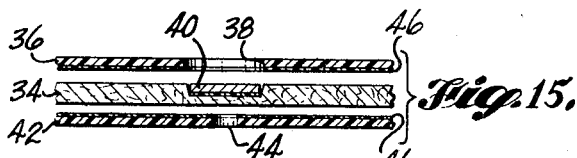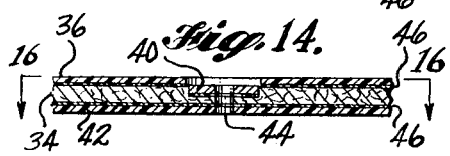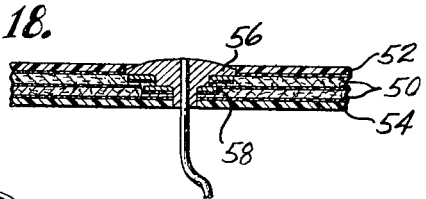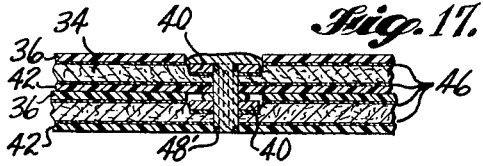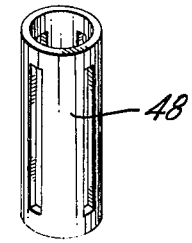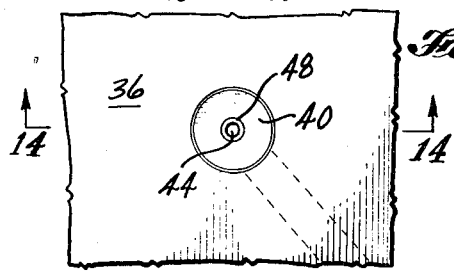
INVENTOR.
WALTER WEGLIN
CHARLES W. WILDEBOUR
BY Orland M. Christensen
ATTORNEY

METHOD OF CONTEMPORANEOUSLY SHEARING AND BONDING CONDUCTIVE FOIL TO A SUBSTRATE

This application is a continuation-in-part of our earlier filed copending application Ser. No. 225,482 entitled Means and Techniques for Stamping and Bonding Foil which we filed on Sept. 24, 1962 and now abandoned.

The invention disclosed herein relates to a method of making a composite structure comprised of a pattern of one or more strips of foil bonded to an underlying support, and to certain composite structures which can be obtained by this method. The invention is particularly applicable to the manufacture of so-called printed electrical circuit boards and will be described with special reference to this type of product. However, it will be apparent as the invention is described, that it is also applicable to the manufacture of a number of other products including decorative wall plaques, place mats, and the like.

All practical printed electrical circuit board manufacturing processes used heretofore employed chemical etching of some type. The chemical etchants left residues, however, which, unless removed by a post rinse, could become conductive and cause high levels of noise, short circuiting, and other problems tending to reduce the reliability of the finished assembly. Since the post rinse added another step to the process and required rigid controls to ensure that a high standard of quality was continuously maintained, the manufacturing industry continually sought to find a practical mechanical technique for producing their product.

It is a principle object of the invention to provide such a practical mechanical technique for producing printed electrical circuit boards and products of a similar nature. A further object is to provide a technique for this purpose in which the circuitry or other foil overlay is produced in a stamping operation and if desired, simultaneously bonded to the supporting medium. Another object is to provide a mechanical technique of this nature in which tooling costs are low, so that the number of units to be made is not critical to the technique's use. This lattermost object recognizes that many of the dry or nonchemical techniques disclosed to date, have failed to achieve commercial acceptance because tooling costs are prohibitive for, say, anything less than 25,000 units.

A still further object of our invention is to provide a rapid, low-cost, dry circuit board manufacturing technique in which the step or steps can be simply and reliably executed without close controls, and if desired, readily automated. One of the dry techniques which was recently disclosed—the "applique technique"—has not proven to be commercially acceptable because it involves certain problems of control which reduce its reliability. According to this technique, the foil is temporarily adhered to a carrier tape and then, in a series of steps, the circuitry is first sheared out against the tape, then physically transferred to a supporting board by means of the tape, and finally adhesively bonded to the board by means of a heated press platen applied over the tape. The transfer step creates a problem in achieving accurate registration of the foil on the board, due to stretching in the tape, and it has also been found that the use of an adhesive on both sides of the foil requires a close measure of control over the action of the adhesives to assure that the tape can be stripped away from the circuitry after the latter is adhered to the board. According to our invention, on the other hand, there is no necessity for carrying over the circuitry from one stage to another, and no problem with bonding, since the process can be executed without a carrier, and without bonding first one side of the foil and then the other. We might add, however, that this fact does not prevent us from using a carrier, a transfer step, and two bonding steps if we choose, since our process can be extended to encompass the applique method if one wishes to do so.

Other objects and advantages will appear from the description following wherein we shall describe our invention in terms of certain preferred modes of practicing the same, but of course, with no intention of limiting it to these modes.

These objects and advantages are realized by a method of our invention wherein initially a continuous uninterrupted layer of die material is placed face-to-face with a flat integral base in a press. A sheet of foil is arranged opposite the foregoing assembly in the press, with a layer of unactivated adhesive material interposed between the foil and the base, and the foil is stamped directly against the opposite face of either the layer of die material or the base, while the layer of die material is compressible in relation to the base without undergoing substantial lateral deformation. The stamping operation is carried out with a stamp having a raised surface thereon which is substantially flat and corresponds in profile width and outline with the pattern of strips, and with a stroke which displaces those portions of the die material lying relatively opposite the surface of the stamp, but which does not compress those portions of the adhesive and die material relatively surrounding the outline of the surface. As a result, shear forces are generated between the respective stamped and unstamped die portions without activating the unstamped adhesive portions. The shear forces separate the pattern of foil strips from the unstamped foil, and the strips are bonded to either the layer of die material or the base, depending on the level at which the stamp's stroke is bottomed in the assembly. Since the unstamped adhesive material is unactivated, the unstamped foil and adhesive material is easily relatively removed from the assembly to expose the pattern of foil strips.

If the foil is stamped against the opposite face of the layer of die material, the layer of die material may become the support for the pattern of foil strips by adjusting the stamp's stroke to bottom the stamp therein. Or the layer of die material may be used solely as the shearing medium for the pattern of foil strips, in which case the stamp's stroke is adjusted to bottom the stamp therebelow. If the foil is stamped against the opposite face of the base, then the base may become the support for the pattern of foil strips by bottoming the stamp in the face thereof.

Moreover, the layer of die material may be inherently compressible without undergoing substantial lateral deformation; or it may be pressure deformable during the stamping operation and a peripheral border may be applied thereabout to limit the lateral deformation thereof. In this latter instance, the layer of die material may be inherently pressure deformable; or it may be thermoplastic and heat may be applied thereto to render it pressure deformable during the stamping operation. An example of a die material which is inherently compressible without undergoing substantial lateral deformation, is one which is nonresinous and embodies a fibrous material therein, such as a Kraft pulp material. Rubber is an example of an inherently pressure deformable material, and certain low melting point alloys such as Cerrobend and the Cerrolows are examples of thermoplastic materials which are heat softenable to render them pressure deformable during the stamping operation.

The layer of die material may be constituted by the layer of adhesive material and vice versa.

The thickness of the layer of die material varies in accord with the choice of material and/or the mode of operation. Generally, the more compressible and/or plastic the die material, the thicker the die must be. Correlatively, the lower its compressibility and/or plasticity, the thinner the die may be, so long as it is not so hard or thin as to produce no shear when the foil is stamped. In addition, if the die material is thermoplastic, i.e., heat softenable, heat can be applied to the die during the stamping operation to increase its compression and plasticity characteristics. Normally the heat is applied through the stamp so as to reduce the risk of fracturing the die and/or the base. Of course, the heat from the stamp will also alter the shear strength of the foil and perhaps reduce the force level needed to shear it.

The die may also be composed of two or more layers of material having different characteristics, in which case the thickness of each layer may depend on the characteristics of the adjacent layer or layers.

Reference to the accompanying drawings will help to understand the manipulative aspects of the invention. In the drawings, FIGS. 1–4 are a series of schematic cross-sectional views of the technique using a low melting point alloy;

FIG. 5 is a perspective view of a simple form of mechanical punch press that can be used in carrying out the technique of FIGS. 1–4, and in which a portion of the upper press platen has been removed to expose the various layers of material that are used in the operation;

FIGS. 6 and 7 are schematic part cross-sectional views of the modification wherein the thermoplastic die material is adhesive in character;

FIGS. 8–10 are schematic part cross-sectional views of the technique carried out with a compressible, but nonplastic die material such as Kraft pulp material;

FIGS. 11–13 are similar views of the technique using an inherently pressure deformable material such as rubber;

FIG. 14 is a part cross-sectional view of a printed circuit board which was produced by sandwiching a printed circuit card from the technique of FIGS. 8–10, between a pair of protective overlays;

FIG. 15 is an exploded part cross-sectional view of the sandwich board of FIG. 14, prior to making the assembly and completing the component lead holes;

FIG. 16 is a part plan view of the sandwich board, showing the printed circuit "pad" through which the section of FIG. 14 was taken;

FIG. 17 is a part cross-sectional view of a soldered multilayered circuit board assembly using the sandwich of FIG. 14;

FIG. 18 is a part cross-sectional view of a less dense form of the assembly seen in FIG. 16; and FIG. 19 is a perspective view of a form of eyelet used in the assembly of FIG. 17.

Referring firstly to FIG. 5, it will be seen that the press consists of upper and lower platens, the upper of which is in the form of a heated stamp 2 and the lower of which is a flattener support 4 for the stamp. The face of the stamp has been relieved to form a plurality of punch elements 6, the outermost of which forms a closed border 6' for the others. Each of the punch elements has a flat impression surface 8 bounded by substantially right angular edges, and the configuration and arrangement of the elements is such as to form the basis for a pattern of printed circuitry to be blanked from the foil.

In preparing for the stamping and bonding operation, a card 10 of dielectric material coated on one side with an adhesive 12, is placed on the flattener support with its adhesive side up. The stamp is then lowered in one or more trial operations until the punch elements bottom at a point making slight contact with the adhesive coating 12. Preferably, the coating should be pre-cured so as to be dry to the touch. After the stamp has been adjusted and withdrawn, first a sheet of thermoplastic die material 14, and then a sheet of foil 16 coated with the adhesive on its underside 18, are laid over the card and clamped into position. As the treated stamp is brought down on the foil, the portions of foil in the path of the punch elements are impressed into the body of the deformable die material 14 and the mass of impacted material under each element is caused to flow in lateral directions. See FIG. 2. Due to the "clinching" or constraining action of the border, however, the deformation of the die material is confined to directions generally perpendicular to the sheet of foil. As a consequence, shearing forces are generated on the foil around all but the outside edge of the border, and given an adequate level of impact in the stamp, the impressed portions 16' of the foil are blanked out of the sheet.

Moreover, if the die material has sufficient plasticity, the portions of it under the foil portions 16' are totally displaced from the path of the punch elements as they proceed to the bottom of the stamp's stroke. See FIG. 3. This brings the adhesive underside of the foil portions 16' into engagement with the adhesive upper side 12 of the card. A bond results from their contact, either through the use of a pressure sensitive adhesive, or the application of heat to the stamp through resistance elements 20 embedded therein; and when the stamp is withdrawn on its return stroke, the foil portions 16' remain "printed" on the upper face of the card. There then remains but the step of stripping away the unstamped foil and die material to expose the overall pattern of printed foil. See FIG. 4. Subsequently, the edges of the card may be clipped to remove any foil left by the border around the circuitry.

Either a hot water dip or a solvent application aids in stripping away the unstamped foil and die material. In addition, if the border does not fully enclose the face of the stamp, a "shoe" of material is left around the edge of the card to provide a grip for purposes of stripping away the materials.

We have also found that heat sensitive adhesives are to be preferred for the reason that they produce a cleaner break between the stamped and unstamped materials in the stripping step.

FIGS. 6 and 7 illustrate the modification of our above technique wherein the shearing and bonding medium are one and the same. A sheet of pressure deformable adhesive material 14' is laid on top of the card 10 to form a die in the manner of FIGS. 1–5, and the foil 16 is stamped against the die as before. However, in this case the impression surface 8' of each punch element 6' has a slight concavity so that a rib 22 of the die material is "pocketed" between each blanked out portion 16' of the foil and the face of the card. The adhesive action of the rib effectively bonds the foil portion to the card, although the resultant "printed" card is normally subjected to a subsequent press step to flatten and thoroughly engage the foil. A post cure may also be necessary to complete the bond provided by each rib.

As in the case of FIGS. 1–5, a border is needed around the punch elements, although none is shown for the sake of simplicity in the illustration. The border may be integral with the stamp, as in FIGS. 1–5, or it may take one of several alternative forms, such as a ring positioned on top of or about the foil and die. It may also be formed within the body of the die itself, as where the die is a composite of a pressure deformable, plastic core surrounded by a "border" of relatively non-deformable material.

FIGS. 8–10 illustrate our cardboard (Kraft pulp) technique. It will be seen that the schematic illustrations now include the flattener support 4 and that only a layer of die material 24 is laid on the flattener support and then overlaid with a sheet of foil 16 coated on its underside with a layer of adhesive 18. The die material 24 is relatively thick and highly compressible, as well as relatively nonplastic, as in the case of kraft pulp material; and when the stamp 2 is brought down on the foil the highly compressible material gives way in its path, without substantial lateral deformation, until the stamp reaches the bottom of its stroke. The reduction in cross-section of the impacted die material produces a counterthrust, however, along the "walls" 24' around each punch element 6, and as a consequence, the foil portions 16' are separated from the body of the foil by shear. Due to its low pasticity, the die material cannot be displaced from the path of the portions 16', as in the case of FIGS. 1–7, and for this reason the stamp stroke is adjusted to bottom the punch elements in the body of the die, well above the flattener support, and preferably at points which will leave the portions 16' countersunk in the die and flush with its upper surface 26. The low resiliency of the die material will not dislodge them from this position, although a subsequent press step is desirable to flatten out and thoroughly engage the portions 16'.

Although it is desirable, no border is needed around the punch elements because the kraft or similar material is compressible but nondeformable by the nature of the material itself. Likewise, no heat is necessary although again it may be desirable, not only for purposes of activating the adhesive, but also for purposes of decreasing the shear strength of the foil.

In FIGS. 11–13, the foil is stamped onto a relatively incompressible but flexible base 28. Due to its impressibility (and accompanying low plasticity), the material 28 is used only in thin layers and when underlaid by a thicker layer of relatively highly compressible material 30, such as rubber. A border 6' is also needed, and if the material 28 is thermoplastic, heat may also be desirable to increase its compressibility and flexibility characteristics. The rubber layer 30 enables the base 28 to flex to the extent that shearing forces are generated on the foil in the same manner as in the earlier embodiments. Due to the relative thinness of the base 28, the stamp can do no more than quickly "kiss" the lay-up, and at the close of the operation, the resiliency of the base 28 may "lift" the blanked out portions 16' into relatively raised positions on the surface 32 thereof. In any event, however, the technique is quite effective in producing a thin product. See FIG. 13.

To some extent, a subsequent press step will not only flatten the foil against the surface 32, but will also impress the foil into the surface to make it more flush with the same.

Understandably, the force level and stroke speed varies with each material, as well perhaps as with its thickness, the heat applied, and the other variables at hand. Therefore, we can only generalize in pointing out that a relatively fast stroke and high force level are used in producing the products of FIGS. 1–5 and 8–10; whereas a relatively slow stroke and low force level are used under the technique of FIGS. 11–13. Often the optimum stamp speed or range or stamp speeds must be obtained empirically, and one advantage of the invention is the fact that a number of throw away samples can be run for this purpose at no great expense. Generally speaking, if the stamp speed is too slow and/or the die temperature is too low in our FIGS. 1–5 technique, the foil will be sheared only in part, if at all, and its edges will be incomplete, irregular, or ill-defined. There may also be a problem in stripping away the unstamped portions of the foil and die. On the other hand, if the stamp speed is too great, the die does not have adequate time in which to give way in the stamp's path and is trapped between the foil and the card. In our FIGS. 11–13 technique, too slow a stamp speed results in fracture of the base; whereas too fast a speed produces incomplete shear and possibly fracture of the base die as well.

Preferably the stamp's forward and return strokes are continuous. There are instances, however, when it is advantageous to allow the stamp to hesitate briefly at or near its bottom position to provide for a brief dwell period in which to cure the adhesive before the stamp starts its return stroke.

Normally, several trial operations are used to determine the optimum stroke for the stamp before production is begun. It is important, of course, that the press be aligned at all times, and incomplete shearing of the foil may indicate "out-of-flatness" in the press set-up and/or too short a stroke. Shredding or tearing of the foil may also indicate "out-of-flatness" and/or too long a stroke. If desired, the flattener support may include a die cushion that is designed to increase the stamp's dwell time and/or control the contact pressure between the foil and the card.

The impression surfaces of the punch elements must have sharp cornered profiles, i.e., substantially right angulared edges, if the foil is to be stamped without tearing, wrinkling and/or other undesirable edging of the sheared out portions. Chem-milling has proven to be the best means for developing the stamp relief. The depth to which the stamp is relieved depends both on the thickness of the foil and on the thickness of the die. Again, an empirical examination is the best means for fixing each of these parameters.

The following examples will detail the application of the inventive techniques to a variety of die materials. In each instance, adhesive coated one ounce CMC-195 copper foil (the premium grade of Circuit Materials Corporation, Somerset, N.J.), 0.00135 inch thick, was "printed" on a dielectric card. The stamp was fabricated from 0.50 inch thick low carbon flat ground steel chem-milled on its working face to a depth of 0.030 inch in relief; then case-hardened to a minimum depth of a 0.040 inch and a hardness value of Rockwell 60–65 (C scale); and then ground to a parallel on both of its faces, and to a flatness of 0.0006 inch TIR and a minimum finish of 16 microinches.

In the first set of examples involving our FIGS. 1–7 techniques, the stamp was secured to the ram of a 110 ton mechanical punch press (at 40 strokes per minute) through the medium of a temperature controlled platen; and epoxy impregnated fiberglass board was chosen as the dielectric card material.

EXAMPLE 1

A 0.0005 to 0.001 inch thick coating of Epocast Resin XV (a condensation product of epichlorohydrin and bisphenol-A catalyzed with amine hardener, manufactured by Furane Plastics, Inc. of Los Angeles) was applied to the dielectric board and pre-cured until dry to the touch. Then the board was positioned on the flattener support of the press and the stroke of the press was adjusted until the stamp left a faint outline on the board. An 8 inch stroke resulted, taking 1½ seconds for the cycle. Next, a 0.010 inch thick sheet of Cerrobend (the eutectic alloy of bismuth, lead, tin, and cadmium, melting point 158° F., manufactured by Cerro Corporation of New York) was laid on the board, followed by the adhesive coated foil. A series of stampings was conducted in which the stamp made contact with the foil and the Cerrobend for 19 milliseconds at 320°–330° F. Following each stamping, a scribe was used to remove the excess foil in hot water; and then the press plates were brought together again to melt the excess Cerrobend, which thereafter could be easily brushed off the board with acetone. The clean board was then pressed to a uniform flatness and the adhesive post cured to improve the bond between the foil and the board.

An adhesive pre-cure of two hours at 150°–160° F., and a post cure at 240°–250° F. for 16 hours, produced a peel strength of up to 8 pounds per inch of width. Boards with standard "printed circuitry" of 0.040–0.045 inch wide copper segments and insulation spaces of 0.055–0.060 inch could be easily obtained with the process. In addition, the Cerrelows (bismuth alloys having high percentages of indium and exceptionally low melting temperatures, also manufactured by the Cerro Corporation) are also useful as the shearing medium.

EXAMPLE 2

In this instance, a ⅛th inch thick sheet of 40 durometer rubber was used as the die material in a series of blanking tests. A single sheet sheared the copper foil with considerable ease. A 60 durometer sheet produced a shear which was not so good, while a sponge rubber sheet produced stampings that were superior to all other durometers of rubber. There was no need for using a hot stamp and as little as a 30 ton load could be used in producing shear. The number of strokes per minute could also be varied over a wide range.

EXAMPLE 3

In this example of blanking, sheets of paraffin beeswax of various thicknesses were used as the shearing medium. When paraffin was used, the foil was torn to shreds due to its low surface friction. Beeswax, on the other hand, was sticky enough to provide a most suitable die material. Little or no softening temperature was needed.

EXAMPLE 4

To test the modification of FIGS. 6 and 7, "Scotchweld" brand bonding adhesive AF-30 (an adhesive of the nitrilephemolic type manufactured by Minnesota Mining and Manufacturing Company) was used in sheets of 0.002–0.020 inch thickness as the shearing and bonding medium. The plastic qualities of the material provided a good shearing medium. For bonding purposes, however, it was desirable to recess the impression surfaces of the punch elements as in FIGS. 6 and 7 to provide a raised rib of adhesive under the body of each foil segment. The rib forms into the stamp cavities before shearing occurs, moreover, and helps to eliminate side-slip and tearing during and after shearing.

In the remaining examples involving our FIGS. 8–13 techniques, a 60 ton press (at 45 strokes per minute) was used in lieu of the 110 ton press.

EXAMPLE 5

Using the technique of FIGS. 8–10, a layer of "Fiberlec" electrical press board, manufactured by Case Brothers of Manchester, Conn., was placed on the flattener support and stamped at 30–35 strokes per minute and 490° ±10° F. The 100 percent virgin kraft pulp (0.95–1.10 grams/cc) produced a good shear at three thirty-seconds inch thickness, and a good bond following a 290° F. cure for 5 seconds.

EXAMPLE 6

Using a border, a stamp temperature of 490°± 10° F., and 20–35 strokes per minute over a stroke length of 2.75 inches (a stroke speed of between 110 inches per minute and 192.5 inches per minute), we were also able to stamp and bond various samples of Nema X-P and Nema XXX-P paper base phenolic impregnates between one-sixteenth and three thirty-seconds inch thick. The post cure ranged between 220° and 315° F. for 2 minutes. Preferably the impregnate should be unplasticized and to get peel strengths of 8 pounds per inch of width, it must be so.

EXAMPLE 7

The inventive technique was practiced in accord with FIGS. 11–13 by placing a 0.006 inch thick layer of epoxy impregnated fiberglass on a one-half inch layer of 60 durometer rubber and carrying out the stamping and bonding procedure of 260°–300° F. and 15 strokes per minute. The stamp speed was within the elastic limit of the fiberglass material and as a consequence, though there, was slight embossing of the foil in the surface of the fiberglass, the blanked out portions of the foil nevertheless stood somewhat above its surface.

Fiberboard also provided a good backing for the fiberglass layer.

In addition to compressibility, plasticity, flexibility, surface friction, and suitability for its intended use (i.e. dielectric, in the case of printed electrical circuit boards), several other factors such as lightness, compatability with the adheseive, and/or water or oil absorption may also enter into the choice of die material. Modern day automatic flow, dip, or fountain soldering operations require a low moisture absorption. On the other hand, a degree of oil absorption, as in the case of the kraft material, may be desirable. Nema XXX-P has a low water absorption (1 percent), and yet relative to the kraft material, can be quite brittle. In those instances where moisture absorption is not material, a kraft, foam rubber, balsa wood or similar compressible product may be preferable, therefore, over the phenolic material, for reasons of economy and adaptability to the process.

To make these compressible products more acceptable for circuit board use, we have devised a "sandwich" construction made up from the product of FIGS. 8–10 and a pair of overlays designed to make the product more rigid and heat-resistant. Referring to FIGS. 14–16, it will be seen that the "sandwich" consists of a printed core 34 of the kraft or similar material, an overlay 36 having holes 38 which register with the "pads" 40 in the printed circuitry, and another overlay 42 which has smaller holes 44 that align with the pads 40 and the holes 38. The smaller holes 44 provide access for the component leads (not shown) and the larger holes 38, for soldering to the pads 40.

The construction eliminates the necessity for drilling small holes in the board, as was previously done, and adapts the board to punch press type operations. In addition, the overlays 36 and 42 also prevent short circuiting, bridging during the soldering operation, and damage to the pads in use. We have also found that they increase the peel strength of the circuitry. In assembling the three layers, the core 34 is first compressed so as to increase its density and to flatten the circuitry into the plane of its surface; and is then inserted between two 0.010 inch thick paper, wax or plastic resin sheets which are suitably punched to provide the component lead and solder access holes 44 and 38, and each coated on one side with an adhesive 46. The sandwich is then bonded together in a press and subjected to a further punch operation in which the punch holes 44 are extended through the core 34 and the pads 40. See the bonded assembly of FIG. 15. If the punches are inserted from the upper side of the assembly, that is, through the pad first, they will "dimple" the pads into the soft core material, thus forming a "funnel" for the solder tubelets used in interconnecting two or more of the sandwiches in a multilayer assembly such as is seen in FIG. 17. The tubelets can be seen at 48 and provide a capillary guide in each hole 44 for a pressed "solder pin" or flowing solder insertion, as are commonly used.

Moreover, where a lower density is desired the basic sandwich construction can be altered still further, as in FIG. 18, to produce a product consisting of two or more core layers 50 bonded between a pair of outer protective layers 52 and 54, with component lead openings 56 and 58 of differing diameters to expose circular portions of the pads 40 from one core layer to the next.

Other similarly advantageous products are also possible from the invention, and it will be appreciated that the lead time required for the fabrication of each product is relatively short, since any changes in a circuit pattern or the like require only that a new stamp be developed for the new pattern.

Also, while the invention has been described in considerable detail with respect to certain techniques and products, many modifications and additions other than those described can be made in and to the invention without departing from the scope and spirit of the same as defined in the claims following.

What is claimed is:

1. A method of manufacturing a composite structure such as a printed circuit board comprised of a pattern of conductive metal strips bonded to a dielectric support, comprising placing in a die-cutting press, a flat base having a hard dry material adjacent the upper surface thereof which is extrudable in relation to the surface at the temperatures and pressures of the die, arranging a sheet of foil above the surface material, interposing a layer of dry partially cured thermosetting adhesive material between the foil and the surface of the base; locally bonding portions of the foil to the base with said adhesive, and simultaneously cutting the portions from the foil, in a single application of the die, by applying against the foil, a flat surfaced die having relief areas delineating said portions and a peripheral clamping area, and extruding the surface material underlying the foil portions so as to form recesses therein, by forcing the foil material underlying the flat surfaces of the die relatively out of the sheet of the same into the surface material, with the die, while clamping the sheet of foil against the surface of the base around the periphery of the pattern and while clamping the sheet of foil against the surface of the base around the periphery of each of the foil portions, to cut the foil at the rims of the recesses, and while heating the surfaces of the die, to heat the underlying foil, adhesive material, and surface material, and while maintaining a clearance between the foil and the relief areas of the die delineating said portions, to maintain the dry unactivated condition of the adhesive overlying the base opposite the relief areas; and relatively removing the die, the unactivated adhesive, and the cut foil overlying the unactivated adhesive, from the base and the foil portions bonded thereon.

2. A method of manufacturing a composite structure such as a printed circuit board comprised of a pattern of conductive metal strips bonded to a dielectric support, comprising placing in a die-cutting press, a flat base having a hard dry material adjacent the upper surface thereof which is extrudable in relation to the surface at the temperatures and pressures of the die, arranging a sheet of foil above the surface material, interposing a layer of extrudable material and a layer of dry partially cured thermosetting adhesive material between the foil and the surface of the base; locally bonding portions of the foil to the base with said adhesive, and simultaneously cutting the portions from the foil, in a single application of the die, by applying against the foil, a flat surfaced die having relief areas delineating the portions, and extruding the surface material and extrudable material underlying the foil portions so as to form recesses therein, by forcing the foil material underlying the flat surfaces of the die relatively out of the sheet of the same through the extrudable material into the surface material, with the die, while clamping the sheet of foil against the surface of the base around the periphery of each of the foil portions, to cut the foil at the rims of the recesses, and while heating the surfaces of the die, to heat the underlying foil, adhesive material, and surface material, and while maintaining a clearance between the foil and the relief areas of the die, to maintain the dry unactivated condition of the adhesive overlying the base opposite the relief areas; and relatively removing the die, the unactivated adhesive, the extrudable material, and the cut foil overlying the unactivated adhesive, from the base and the foil portions bonded thereon.

3. The method according to claim 2, wherein the extrudable material in the layer is a low melting point alloy and said alloy is removed during the removing step.

* * * * *